United States Patent [19]

Sasase et al.

[11] Patent Number: 4,460,198
[45] Date of Patent: Jul. 17, 1984

[54] PASSIVE SEATBELT SYSTEM

[75] Inventors: Naoshi Sasase, Aichi; Nobukatsu Inagaki, Nagoya; Yoshihiro Hayashi, Kasugai; Yuji Nishimura, Nagoya, all of Japan

[73] Assignees: Toyota Jidosha Kogyo Kabushiki Kaisha; Kabushiki Kaisha Tokai-Tika-Denki-Seisakusho, of Japan

[21] Appl. No.: 70,906

[22] Filed: Aug. 29, 1979

[30] Foreign Application Priority Data

Aug. 31, 1978 [JP] Japan ............................ 53-120012[U]

[51] Int. Cl.³ .............................................. B60R 21/10
[52] U.S. Cl. .................................................... 280/804
[58] Field of Search ............... 280/804, 803, 802, 808; 297/469

[56] References Cited

U.S. PATENT DOCUMENTS 3,822,760 7/1974 Linblad ............................... 280/804
3,971,570 7/1976 Nilsson et al. ....................... 280/804
4,061,365 12/1977 Nagano et al. ...................... 280/804

Primary Examiner—Robert R. Song
Attorney, Agent, or Firm—Parkhurst & Oliff

[57] ABSTRACT

An outer end portion of a webbing is guided in the longitudinal direction of the vehicle, and a tongue plate provided on said outer end portion is engaged with a buckle device secured to the rear portion of a roof side, whereby the webbing is fastened to an occupant. A release plate movable a certain distance with respect to the tongue plate is moved forwards in the vehicle by drive means, whereby the tongue plate is moved forwards in the vehicle after the tongue plate is disengaged from the buckle device, so that the webbing can be separated from the occupant to automatically unfasten the webbing from the occupant.

1 Claim, 6 Drawing Figures

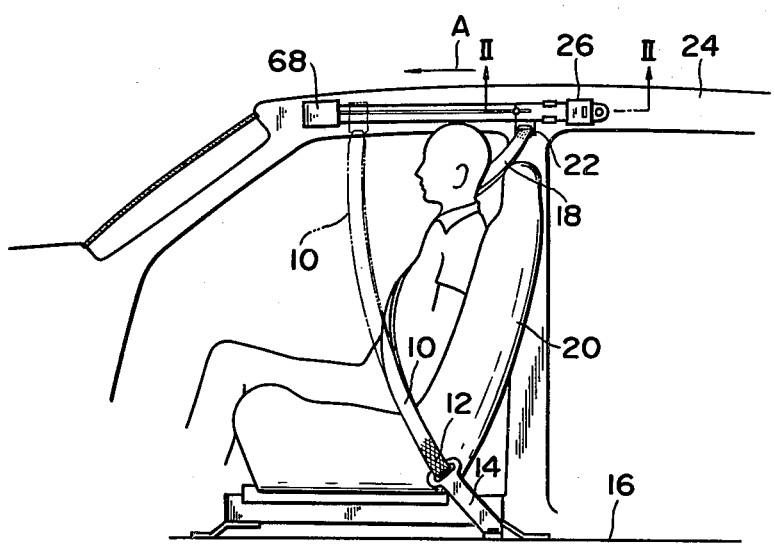
FIG_1

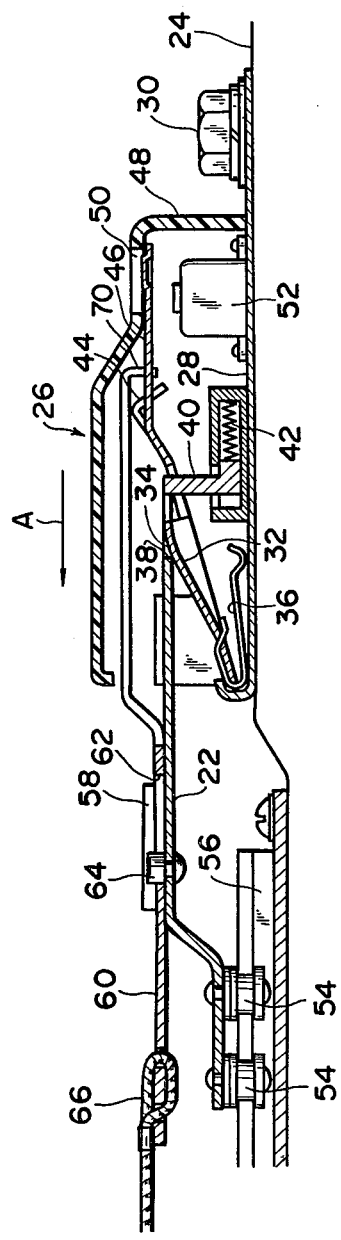
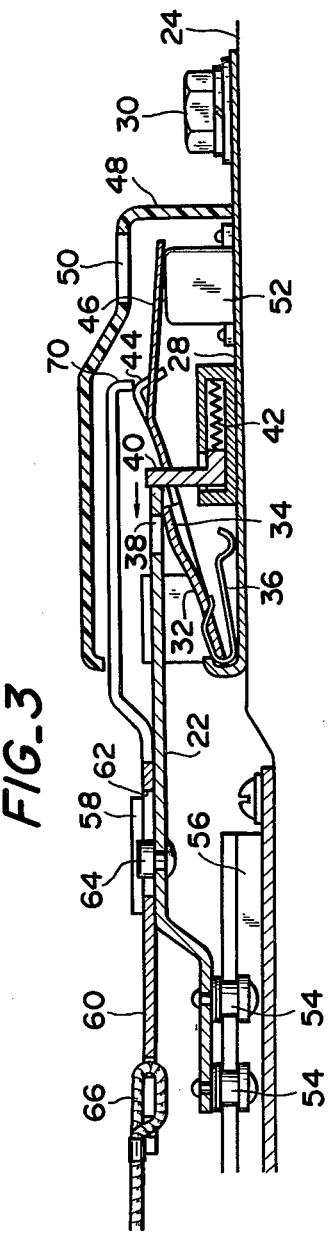
FIG._2
FIG._3

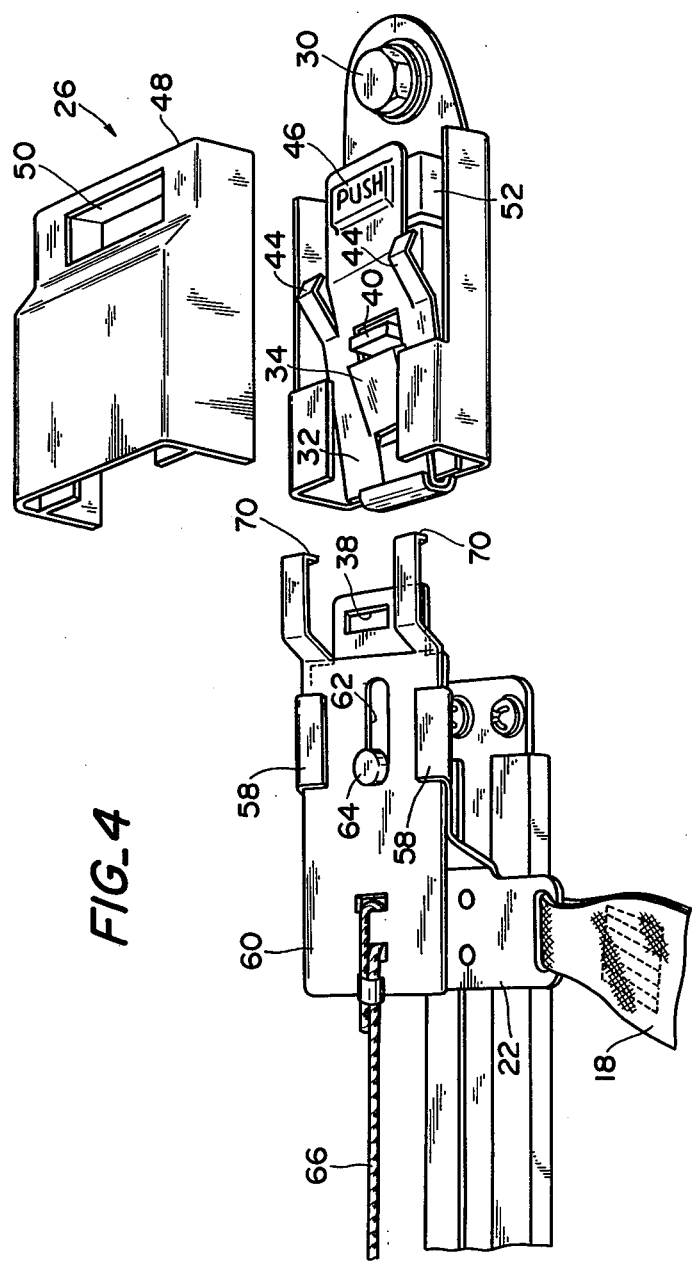
FIG_4

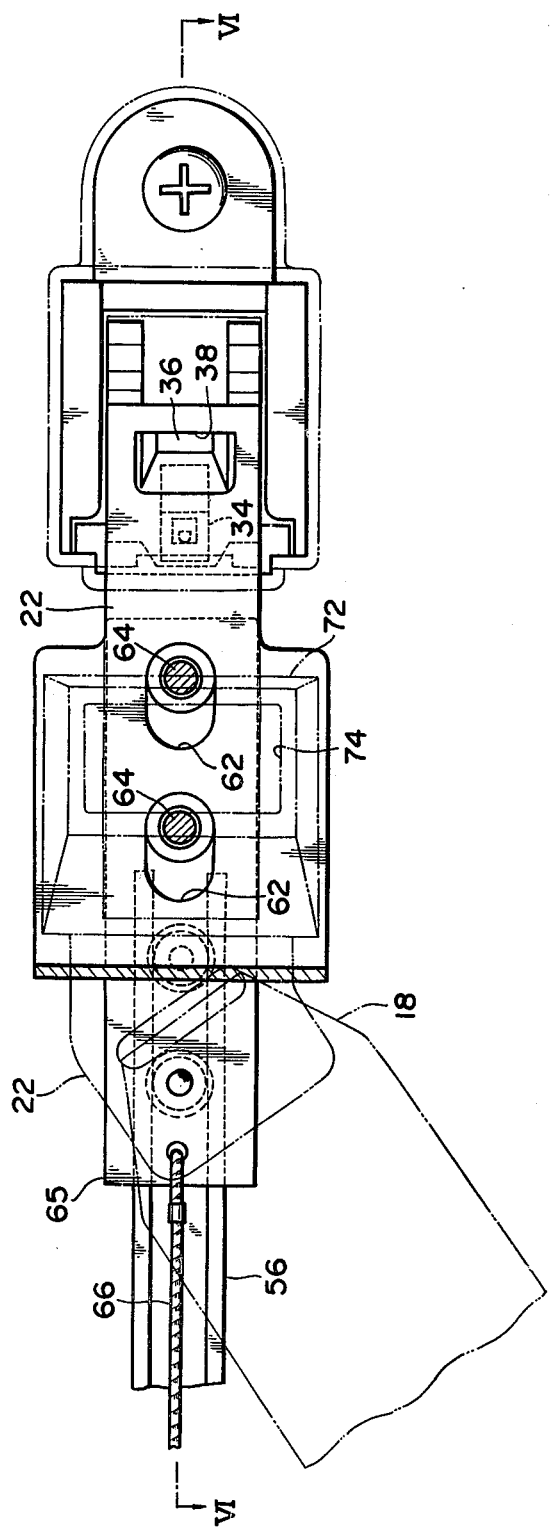
FIG_5

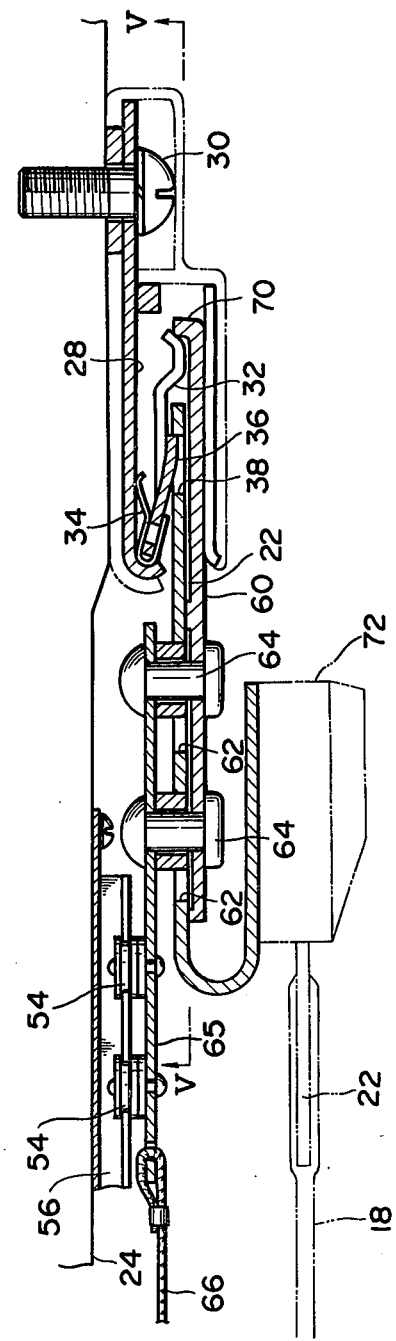
FIG._6

PASSIVE SEATBELT SYSTEM

BACKGROUND OF THE INVENTION

1. FIELD OF THE INVENTION

This invention relates to a passive seatbelt system capable of automatically fastening a webbing for restraining an occupant after he is seated at his seat.

2. DESCRIPTION OF THE PRIOR ART

In spite of the fact that remarkably high level of safety is attained by seatbelt systems in an emergency of a vehicle, the rate of fastening seatbelt systems is very low. Hence, there have been proposed passive seatbelt systems capable of automatically fastening a webbing to an occupant after he is seated at his seat. Said passive seatbelt systems are constructed such that an outer end portion of a webbing for restraining an occupant is made movable in the longitudinal direction of a vehicle along the roof side of the vehicle, whereby the webbing is made to approach or separated from the occupant's seat, so that a space for the occupant to get on or off the vehicle can be formed and the webbing can be fastened to the occupant after he is seated.

However, with said passive seatbelt system, it is necessary to make the vehicle to support tension generated in the webbing in an emergency of the vehicle so as to ensure the safety of the occupant and an anchor device for engaging said outer end portion with the vehicle body is required when said outer end portion is moved rearwards in the vehicle. It follows that, the conventional passive seatbelt system is of such arrangement that a stopper pin is penetrated through an outer end portion by a driving force of a solenoid or the like so as to engage the outer end portion with the vehicle body when the outer end portion is moved rearwards in the vehicle, which renders a considerably complicated construction, thus resulting in unreliable working or releasing of the anchor due to the interruption of a power source of the vehicle or the like.

SUMMARY OF THE INVENTION

In view of the above facts, one object of the present invention is to provide a passive seatbelt system capable of automatically and reliably engaging the outer end portion of the webbing with or disengaging same from the vehicle body with a simple construction.

The passive seatbelt system according to the present invention is of such an arrangement that a buckle device is secured to the rear portion at the roof side for engaging a tongue plate with which is engaged the outer end portion of the webbing, a release plate for releasing the engagement of the tongue plate of the buckle device is made movable by a driving force of a drive mechanism, and the release plate is made movable a certain distance in the longitudinal direction of the vehicle with respect to the tongue plate, whereby the tongue plate is automatically engaged with or disengaged from the buckle device by a driving force imparted to said release plate.

Description will hereunder be given of embodiments of the present invention with reference to the drawings.

BRIEF DESCRIPTION OF THE DRAWINGS

FIG. 1 is a side view of the interior of the cabin showing a first embodiment of the passive seatbelt system according to the present invention;

FIG. 2 is a cross-sectional view taken along the line II—II in FIG. 1;

FIG. 3 shows the operation of FIG. 2;

FIG. 4 is a perspective view showing the state of the tongue plate being released;

FIG. 5 is a front view showing a second embodiment of the present invention; and FIG. 6 is a cross-sectional view taken along the line VI—VI of FIG. 5.

DESCRIPTION OF THE PREFERRED EMBODIMENT

FIGS. 1 through 4 show the first embodiment of the present invention. An inner end portion 12 of a webbing 10 for restraining an occupant is engaged with a floor member 16 of a vehicle through an anchor 14, and an outer end portion 18 thereof is engaged with a tongue plate 22 at a position opposite said inner end portion 12 through the occupant's seat 20. Said tongue plate 22 is moved in the longitudinal direction along a roof side 24 of the vehicle, whereby the webbing 10 is approached or separated from the occupant's seat 20 to automatically fasten the webbing to the occupant, and, when moved rearwards in the vehicle along the roof side 24, is engaged with the buckle device 26.

As shown in FIG. 2 in detail, in the buckle means 26, a portion of a buckle body 28 is solidly secured to the roof side 24 through a mounting bolt 30, and one end portion of said buckle body 28 forwards in the vehicle (in the direction indicated by an arrow A) is bent for enveloping and rotatably supporting one end portion of a locking plate. The intermediate portion of said locking plate 32 is formed with a pawl 34 which is biased in the direction of being separated from the buckle body 28 by a biasing force of a leaf spring 36 confined between the locking plate 32 and the buckle body 28, and inserted into an engageable hole 38 of the tongue plate 22 to be inserted into the buckle device 26 so as to engage the tongue plate 22, thereby preventing the tongue plate 22 from falling off the buckle device 26.

Consequently, when said locking plate 32 rotates in the direction of the buckle body 28 against the biasing force of the leaf spring 36 as shown in FIG. 3, the pawl 34 gets away from the engageable hole 38 of the tongue plate 22 to release the engagement of the tongue plate, thus disengaging the tongue plate from the buckle device. Here, the buckle body 28 is provided thereon with a push-out lever 40 and a coil spring 42 for biasing said push-out lever 40, whereby the tongue plate 22 is pushed out forwards in the vehicle when the tongue plate 22 is disengaged.

The intermediate portion of said locking plate 32 is formed with an engageable projection 44, and the rearward end of said locking plate 32 is formed into a manual operation portion 46. Said manual operation portion 46 faces to a window 50 of a cover 48 crowned on the buckle body 28, so that, in an emergency of the vehicle, the occupant can push the manual operation portion 46 through the window 50 to realize the disengaged condition of the tongue plate as shown in FIG. 3. Furthermore, in said disengaged condition, a switch 52 secured to the buckle body 28 can be operated.

A plurality of wheels 54 are pivotally supported at the end portion of the tongue plate 22 in the forward portion of the vehicle and adapted to be guided by a rail 56 laid on the roof side 24 in the longitudinal direction of the vehicle.

Additionally, the tongue plate 22 is provided at the intermediate portion thereof with a pair of letter 'L' shaped sliding guides 58 extending therefrom to envelope a release plate 60. A stud 64 erectedly provided on the tongue plate 22 is inserted through a slot 62 penetrated in the central portion of said release plate 60, so that said release plate 60 can move by a stroke of the slot 62 in the longitudinal direction of the vehicle relative to the tongue plate 22. One end of a push-pull wire 66 is engaged with the end portion of said release plate 60 in the forward portion of the vehicle, and the other end of said push-pull wire 66 is wound up by drive means 68 secured to the end portion of the roof side 24 in the forward portion of the vehicle as shown in FIG. 1.

Said drive means 68 is adapted to be actuated by a switch provided on a door for getting on or off the vehicle or the like. For instance, in the case the door for getting on or off the vehicle is opened, the push-pull wire 66 is moved forwards in the vehicle, whereby the tongue plate 22 is moved forwards in the vehicle through the release plate 60 as indicated by two-dot chain lines in FIG. 1, so that the webbing 10 can be separated from the occupant's seat 20. In the case the door is closed, the webbing 10 is moved in the direction opposite to the above, i.e., rearwards in the vehicle so as to approach the occupant's seat, so that the webbing 10 can be fastened to the seated occupant. In addition, said drive means 68 is adapted to move the wire 66 forwards in the vehicle when the switch provided in the buckle device 26 is operated.

In passing, as a means of imparting a moving force to the tongue plate 22, in addition to the push-pull wire for imparting a compressive or tensile force thereto as described above, various imparting means are applicable only if the means may reliably move the tongue plate 22 in the longitudinal direction of the vehicle.

The end portion of said release plate 60 in the rear portion of the vehicle is formed into a hook-shaped portion 70 bent in the direction of the roof side 24, and, in the condition where the tongue plate 22 is engaged with the buckle device 26, said hook-shaped portion 70 is disposed more rearwardly of the engageable projection 44 of the locking plate 32 in the vehicle. In the case said hook-shaped portion 70 is moved forward from the abovedescribed position, it engages the engageable projection 44, so that the locking plate 32 can be moved in the direction of the buckle body 28 against the biasing force of the leaf spring 36.

Description will hereunder be given of operation of the first embodiment of the present invention with the arrangement as described above. If the occupant opens the door for getting on the vehicle, then the drive means 68 moves the wire 66 forwards in the vehicle so as to move the tongue plate 22 forwards in the vehicle through the release plate 60, whereby the webbing 10 forms a space for getting on the vehicle between the occupant's seat 20 and itself as indicated by two-dot chain lines in FIG. 1, thereby enabling the occupant to readily be seated.

Then, if the occupant closes the door after he is seated, then the drive means 68, in contrast with the above, moves the wire 66 rearwards in the vehicle, whereby the tongue plate 22 approaches the buckle device 26. Since the driving force of the wire 66 is imparted to the tongue plate 22 during rearward movement of said tongue plate 22, the stud 64 of said tongue plate 22 is moved in the slot 62 of the release plate 60 forwards in the vehicle to the maximum value. By this, the tongue plate 22 is further moved rearwards in the vehicle, and, when said tongue plate 22 is engaged with the locking plate 32 of the buckle device 26 as shown in FIG. 2, the hook-shaped portion 70 of the release plate 60 is moved more rearwards in the vehicle than the engageable projection 44 of the locking plate 32.

The tongue plate 22 is engaged with the buckle device 26 as described above, so that the webbing 10 can automatically be fastened to the occupant and the outer end portion of the webbing 10 can be reliably supported by the roof side 24. By this, even in an emergency of the vehicle such as a collision, the webbing 10 can reliably restrain the occupant, thus ensuring the safety of the occupant.

Thereafter, when the occupant opens the door for getting off the vehicle, the drive means 68 moves the wire 66 forwards in the vehicle, whereby the release plate 60 moves forwards in the vehicle by a stroke of the slot 62 despite the tongue plate 22 remains stationary. Here, the hook-shaped portion 70 of the release plate 60 is engaged with the engageable projection 44 of the locking plate 32, whereby the locking plate 32 is separated from the tongue plate 22 as shown in FIG. 3, so that the tongue plate 22 is disengaged from the buckle device 26. Consequently, as the wire 66 is moved forwards in the vehicle, the tongue plate 22 is also moved forwards in the vehicle, whereby the webbing 10 is separated from the occupant's seat 20 to form a space for the occupant to get off the vehicle, thus enabling the occupant to readily get off the vehicle.

Further, when the occupants need get off the vehicle after the collision of the vehicle in the emergency as described above, if he presses the manual operation portion 46 through the window 50 formed in the cover 48 of the buckle device 26, then the locking plate 32 releases the tongue plate 22 as shown in FIG. 3, whereby the tongue plate 22 becomes movable forwards in the vehicle and the manual operation portion 46 thus pressed actuates the switch 52 to cause the drive means 68 to move the wire 66 forwards in the vehicle, so that the occupant can be unfastened from the webbing 10, thereby enabling the occupant to get off the vehicle safely. Additionally, even in the case the switch 52 is not provided, if the manual operation 46 is pressed, then the tongue plate 22 compresses the wire 66 to be slackened, so that the wire 66 can be moved forwards in the vehicle.

Next, FIGS. 5 and 6 show the second embodiment of the present invention. As differed from the preceding embodiment, in the second embodiment, the wheels 54 are secured to the release plate 60 through the stud 64 and the plate 65, and the outer end portion 18 of the webbing 10 is engaged with the tongue plate 22 through the buckle device 72 solidly secured to the tongue plate 22.

Consequently, with the second embodiment, the same effects as with the preceding embodiment are obtainable, and moreover, in the second embodiment, if the occupant presses a release button 74 provided on a buckle device 72 for getting off the vehicle after the collision of the vehicle, then the tongue plate 22 and the outer end portion 18 of the webbing can be released from the buckle device 72, so that the switch 52 in the preceding embodiment can be omitted. Further, said buckle device 72 may have the same construction as the buckle device 26 has.

As has been described above, the passive seatblet system according to the present invention comprises the buckle device provided at the rear portion of the roof side, the tongue plate engaging the outer end portion of the webbing and engageable with the buckle device, and the release plate movable a certain distance in the longitudinal direction of the vehicle with respect to the tongue plate for receiving the driving force from the drive means, and hence, such excellent advantages are presented that it can be reliably effected that the outer end portion of the webbing is automatically supported on or released from the vehicle by the simple construction.

What is claimed is:

1. A passive seatbelt system, wherein drive means is provided which can move an outer end portion of a webbing for restraining an occupant along a roof side of a vehicle in the longitudinal direction of the vehicle so as to automatically fasten the webbing to or unfasten same from the occupant, comprising:

(a) a tongue plate engaged with the outer end portion of said webbing;
   (b) a buckle device secured to the rear portion of the roof side for engaging said tongue plate, and
   (c) a release plate coupled to said drive means for movement in forward and rearward longitudinal directions of the vehicle and for releasing the engagement of the tongue plate from said buckle device when the release plate moves forward in the vehicle, said release plate being secured to the tongue plate in a manner to be movable a certain distance in the longitudinal direction of the vehicle whereby the tongue plate is automatically engaged to or disengaged from the buckle device by a driving force of said drive means;

wherein a rotatable locking plate for engaging the tongue plate is provided on said buckle device, said locking plate is manually rotatable to release the engagement of the tongue plate, and the rotation causes a switch to actuate said drive means, whereby the tongue plate is moved forward in the vehicle.

* * * * *